United States Patent [19]

Kapoor

[11] Patent Number: 5,701,311
[45] Date of Patent: Dec. 23, 1997

[54] REDUNDANT ACKNOWLEDGEMENTS FOR PACKETIZED DATA IN NOISY LINKS AND METHOD THEREOF

[75] Inventor: Vijay Kapoor, Phoenix, Ariz.

[73] Assignee: Motorola, Inc., Schaumburg, Ill.

[21] Appl. No.: 598,783

[22] Filed: Feb. 8, 1996

[51] Int. Cl.$^6$ .................................................. H04L 1/16
[52] U.S. Cl. ............................................................ 371/32
[58] Field of Search ........................................ 371/32, 33

[56] References Cited

U.S. PATENT DOCUMENTS 5,483,545  1/1996  Darmon et al. .............................. 371/32

OTHER PUBLICATIONS

Nakamura et al., "ARQ Scheme Reinforced with Past Acknowledgement Signals", IEEE CH2520-5, 1987, pp. 53-2-1 to 53-2-5, Dec. 1987.
Nanda et al., "A Retransmission Scheme for Circuit-Mode Data on Wireless Links" IEEE Journal on Selected Areas in Communications, vol. 12, No. 8, Oct. 1994, pp. 1338-1352, Oct. 1994.

*Primary Examiner*—Stephen M. Baker
*Attorney, Agent, or Firm*—Kevin K. Johanson

[57] ABSTRACT

A communication system dispatches packet data (130) from a master transceiver (10) to a slave transceiver (20). A slave transceiver (20) records the successful arrival of the data packet (130) in an acknowledgment history (115). When propagation conditions between a slave transceiver (20) and a master transceiver (10) are non-ideal, an acknowledgment (140) may be lost and needless retransmission of data packet (130) commenced. However, a slave transceiver (20) generates an acknowledgment (140) from an acknowledgment history (115) containing confirmations for multiple data packets contained within an outstanding packet window (120). If a specific acknowledgment (140) does not arrive at a master transceiver (10), a subsequent acknowledgment (140) contains confirmation of a previously received data packet (130) thus avoiding the needless retransmission of a previously successfully received data packet (130).

20 Claims, 3 Drawing Sheets

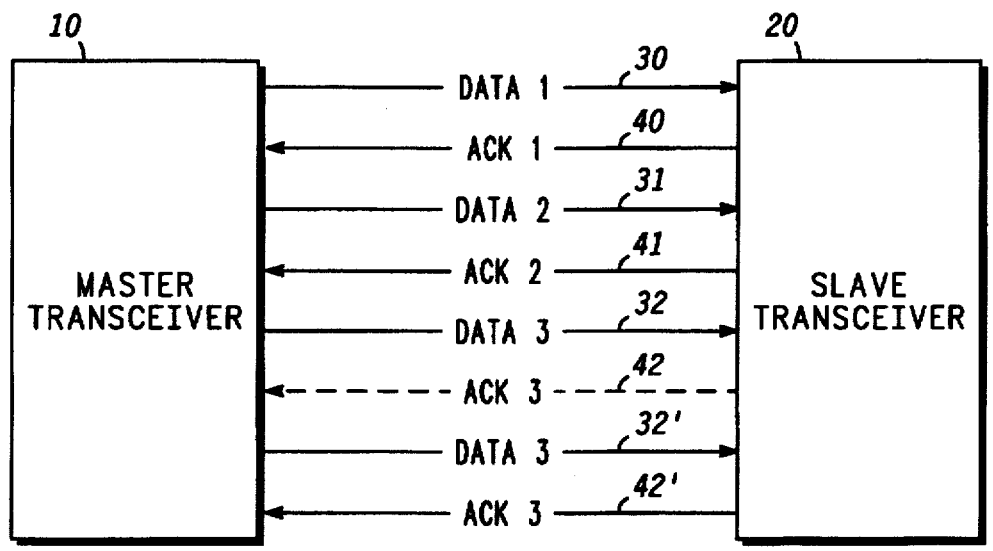
FIG. 1 —PRIOR ART—
—PRIOR ART— FIG. 2
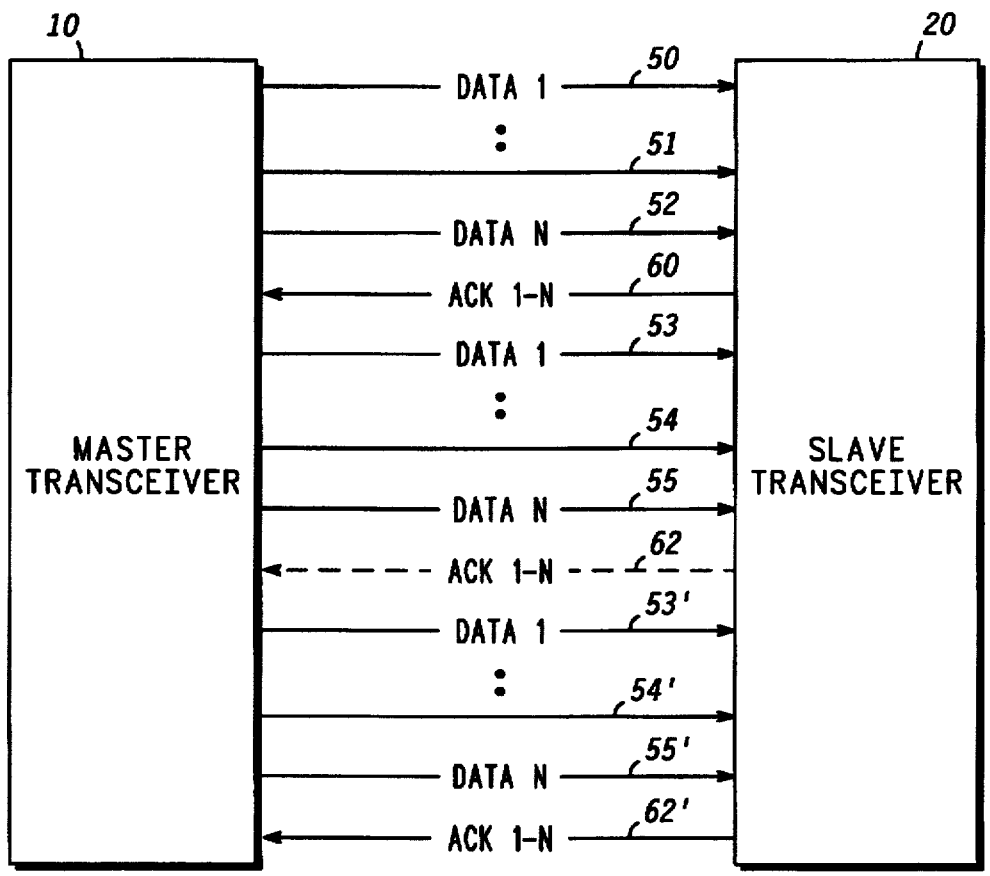

5,701,311

REDUNDANT ACKNOWLEDGEMENTS FOR PACKETIZED DATA IN NOISY LINKS AND METHOD THEREOF

FIELD OF THE INVENTION

This invention relates generally to digital communications, and more particularly to packetized data transfers through high bit-error rate environments.

BACKGROUND OF THE INVENTION

Traditional packetized data communication systems employ acknowledgment responses to confirm the successful arrival of data packets transmitted from a master transceiver to a slave transceiver. Transmission of data packets under near ideal circumstances, nearly always results in successful intact arrival of packets at a receiving or slave transceiver. However, as wireless communication becomes more pervasive, congestion and interference over the airwaves becomes more of a problem. Frequently, data packets are jumbled during propagation and reception may be difficult or impossible. When data packets do not arrive intact as transmitted, they must be retransmitted and these retransmissions impact the bandwidth of a communication channel.

Receiving or slave transceivers upon receiving an intact data packet generate an acknowledgment response to confirm the successful arrival of the data packet and transmit this acknowledgment back to the sending or master transceiver. When a master transceiver receives an acknowledgment, transmission of new data packets may commence. However, transmission of acknowledgments are also susceptible to propagation path interference conditions that may destroy an acknowledgment during propagation to a master transceiver. When this occurs, a master transceiver responds equivalently to the data packet not having arrived at the slave transceiver and commences a needless retransmission of the data packet. Such retransmission of successfully received data packets by a slave transceiver, needlessly wastes bandwidth and resources.

Thus, what is needed is a system and method for enhancing the probability of arrival and detection of acknowledgments of successfully received data packets by the transmitting or master transceiver.

BRIEF DESCRIPTION OF THE DRAWINGS

The invention is pointed out with particularity in the appended claims. However, a more complete understanding of the present invention may be derived by referring to the detailed description and claims when considered in connection with the figure.

FIG. 1 shows a block diagram of successive transmissions between transceivers as taught in the prior art;

FIG. 2 shows a block diagram of successive transmissions between transceivers as taught in yet other prior art;

Figure 3:
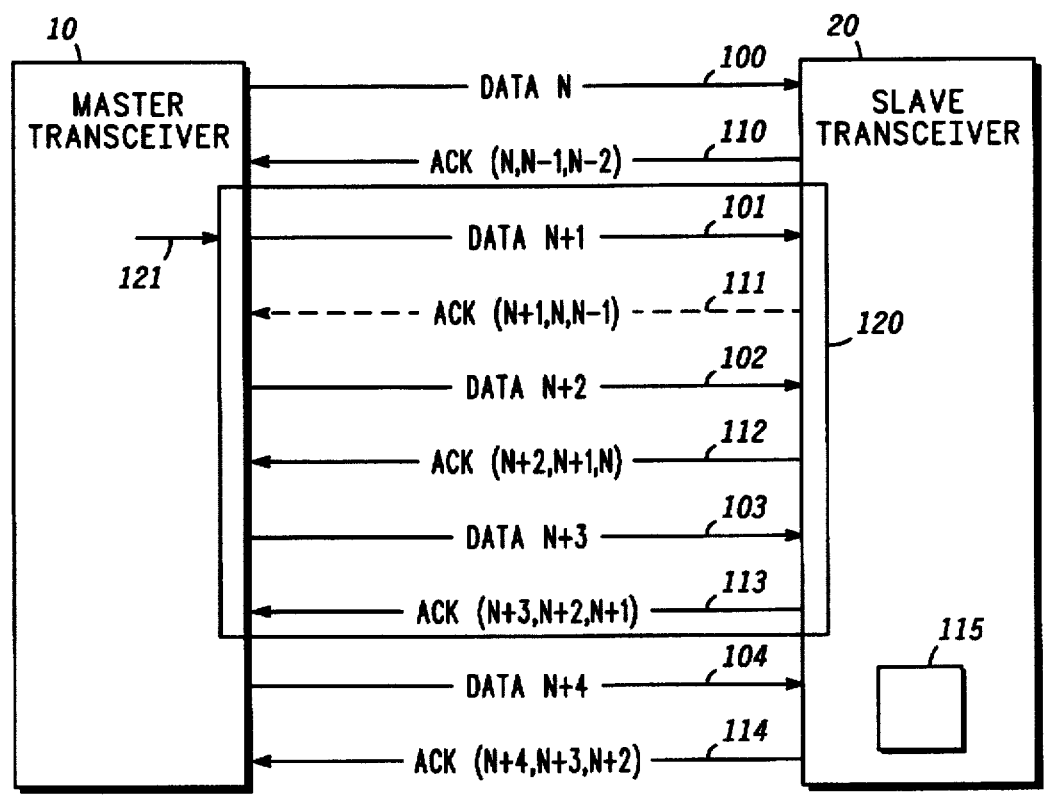
FIG. 3 shows a block diagram of successive transmissions between transceivers in accordance with an embodiment of the present invention.

The exemplification set out herein illustrates a preferred embodiment of the invention in one form thereof, and such exemplification is not intended to be construed as limiting in any manner.

DETAILED DESCRIPTION OF THE DRAWING

The present invention provides, among other things, a method and system for improving the likelihood of reception of an acknowledgment at a data packet dispatching transceiver confirming the intact arrival of data packets at a slave transceiver.

FIG. 1 shows a block diagram of successive transmissions between transceivers as taught in the prior art. As shown, communications between a master transceiver 10 and slave transceiver 20, in their most basic form, may follow a traditional ping-pong approach with master transceiver 10 transmitting data packet 30 to slave transceiver 20 and slave transceiver 20 responding with an acknowledgment (ACK) ACK 40. Such communication continues with data packet 31 and ACK 41.

However, under non-ideal conditions such as wireless communications or other interfering conditions, data packet 32 may successfully arrive at slave transceiver 20, but ACK 42 is obstructed during propagation and does not confirm to master transceiver 10 the successful arrival of data packet 32. When such a condition exists, master transceiver 10 retransmits data packet 32 shown as data packet 32'. Slave transceiver 20 detects the intact arrival and generates ACK 42' associated with data packet 32'. If conditions are conducive to successful propagation of ACK 42', then master transceiver 10 advances transmission to a successive data packet.

FIG. 2 shows a block diagram of successive transmissions between transceivers as taught in yet other prior art. An alternate communication process known in the prior art allows a master transceiver 10 to transmit multiple data packets 50–52 to a slave transceiver 20 before ceasing and awaiting return acknowledgments. Slave transceiver 20 generates and transmits ACK 60 confirming the successful arrival of data packets 50–52.

However, under non-ideal propagation conditions, when a master transceiver may successfully transmit data packets 53–55 to slave transceiver 20, but a confirming ACK 62 may be interfered with prior to reaching master transceiver 10. When this occurs, master transceiver 10 retransmits data packets 53'–55' to slave transceiver 20. Upon successful arrival of data packets 53'–55', slave transceiver 20 responds with ACK 62' to master transceiver 10. Redundant retransmissions of successfully delivered data packets taxes communication resources.

FIG. 3 shows a block diagram of successive transmissions between transceivers in accordance with an embodiment of the present invention. A master transceiver 10 transmits data packets to a slave transceiver 20. Master transceiver 10 and slave transceiver 20 operate together with master transceiver 10 transmitting data packets and slave transceiver 20 synthesizing an acknowledgment of a successful arrival of a current data packet and successful arrivals of previous data packets contained within an operating window.

Master transceiver 10 transmits data packet 100 to slave transceiver 20. Slave transceiver 20 verifies that data packet 100 is intact and stores the data packet and records an identifier of data packet 100 in an acknowledgment history 115. From acknowledgment history 115, slave transceiver prepares ACK 110 by retrieving and including identifiers, such as packet numbers of a portion of previous successfully received data packets. The portion included by slave transceiver 20 in ACK 110 corresponds to a pre-negotiated operating window known as outstanding packet window 120.

Outstanding packet window 120 defines an operational window wherein master transceiver 10 may sequentially continue to transmit subsequent ones of data packets while awaiting responses. If response or acknowledgments to these transmission are not received, then master transceiver 10 backs up and begins retransmitting previously transmitted data packets. When acknowledgments are received by master transceiver 10 from slave transceiver 20, master transceiver 10 incrementally advances outstanding window base pointer 121. Outstanding window base pointer 121 defines the trailing edge of outstanding packet window which corresponds to the oldest or earliest sent data packet contained within outstanding packet window 120. Outstanding window base pointer 121 is not incremented until an acknowledgment for the data packet pointed to has been successfully received.

Slave transceiver 20 tracks outstanding packet window 120, in the preferred embodiment, by reporting the highest received packet number and other data packet identifiers occurring within the pre-negotiated window size in the generated acknowledgments. Slave transceiver 20 may implement a pointer structure by using the highest received packet number as a leading edge of outstanding packet window 120 and reporting all historical data falling within that window.

Outstanding packet window 120 is shown as having a pre-negotiated or pre-determined value of 3 allowing for the transmission of three subsequent data packets maximum without retransmitting un-acknowledged data packets pointed to by outstanding window base pointer 121. The size of outstanding packet window may be varied depending on several factors such as the integrity of the acknowledgment channel. When acknowledgment channels are robust, windows may be expanded to allow master transceiver 10 to transmit many data packets prior to verifying an acknowledgment, or outstanding packet window 120 may be relatively small to enforce verification of received data packets prior to dispatching additional data packets into the communication system.

ACK 110 is shown reporting the successful receptions of data packets N, N-1, and N-2, corresponding to sequential entries in the acknowledgment history contained within slave transceiver 20. When ACK 110 is received by master transceiver 10, outstanding window base pointer 121 is incremented to denote successful reception of data packet 100. Master transceiver transmits data packet 101 to slave transceiver 20 and receives ACK 111. Master transceiver 10 then increments outstanding window base pointer 121 to point at data packet 102.

As shown in FIG. 3, slave transceiver 20 successfully receives data packet 102, stores an entry indicating this success in acknowledgment history 115, and generate ACK 112. However, due to obstructing propagation conditions, ACK 112 is not received by master transceiver 10. In prior art systems, master transceiver would immediately retransmit data packet 102 to slave transceiver 20 and await confirmation. However, in the present invention, master transceiver 10 is allowed to continue to transmit additional data packets as long as they are within outstanding packet window 120. Master transceiver transmits data packet 103 and slave transceiver 20 successfully receives data packet 103 and records the success in the acknowledgment history.

Slave transceiver generates an acknowledgment listing the successful receipt of data packet 103 and other previous successful receipts occurring within outstanding packet window 120. One of these additionally reported successes from acknowledgment history 115 relates to the successful earlier receipt of data packet 102. Slave transceiver 20 transmits ACK 113 to master transceiver 10. Master transceiver 10 upon receiving ACK 113, notes the successful entry for both data packet 103 and the previously non-received entry for data packet 102. Master transceiver 10 now recognizes that in fact data packet 102 was received intact by slave transceiver 20 but that the acknowledgment for data packet 102 was lost. Master transceiver 10 need not retransmit data packet 102, and thus bandwidth and system resources have been conserved. Supposing that ACK 113, also has been lost during transmission, if master transceiver was still permitted by the constraints of outstanding packet window 120, master transceiver 10 would transmit successive data packet 104 and await ACK 114 confirming yet again the successful arrival of data packet 104, 103, and 102.

Also, in multipath or connectionless communication systems where sequential data packets may be routed through different channels or paths, reception of out-order data packets is accommodated by slave transceiver 20. Slave transceiver 20 stores a data packet identifier such as the data packet number in acknowledgment history 115 and reports the arrival in the acknowledgment sent to master transceiver 10. Because both master transceiver 10 and slave transceiver 20 operate within outstanding packet window 120, master transceiver need not immediately retransmit the slower data packet if master transceiver may continue to transmit subsequent data packets as allowed by outstanding packet window 120. If the slower data packet arrives at slave transceiver 20, an acknowledgment will be generated and transmitted and if lost, the successful status of the slower packet may be reported by subsequent acknowledgments, thus avoiding the need for a retransmission.

Figure 4:
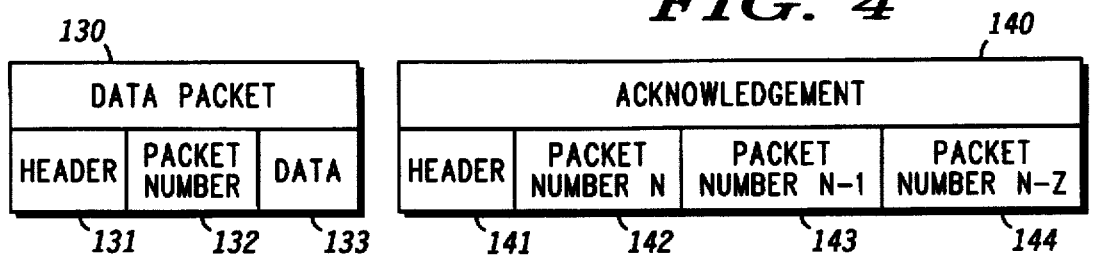
FIG. 4 shows a diagram of data formats in the accordance with an embodiment of the present invention.

FIG. 4 shows a diagram of data formats in the accordance with the present invention. A data packet 130 conveys digitized data from master transceiver 10 to slave transceiver 20. A generalized data format is shown having a header 131 that may carry routing or synchronizing data depending on the specific configuration of a communication system. Data packet 130 is further comprised of an identifier such as a data packet number 132. Data packet number 132 uniquely identifies an individual data packet 130 for acknowledgment purposes and may serve other purposes such as enabling slave transceiver 20 to reassemble received data packets in sequential order for synthesizing data 133.

FIG. 4 also shows a data structure for an acknowledgment (ACK) 140. ACK 140 as transmitted from slave transceiver 20 to master transceiver 10 may be comprised of a header 141 for carrying synchronization or routing data dependent upon the configuration of a communication system. ACK 140 also comprises a series of packet number slots 142–144 depending on the size of outstanding packet window 120. Packet number slots 142–144 convey packet numbers from the acknowledgment history stored in slave transceiver 20.

Figure 5:
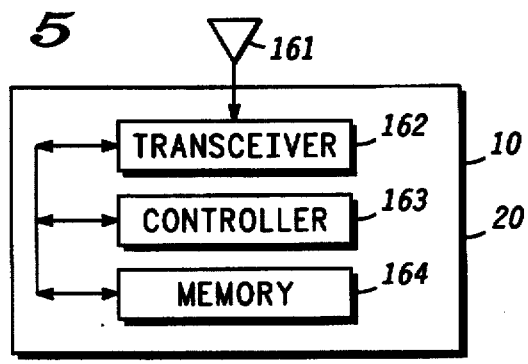
FIG. 5 shows a block diagram of a master and slave transceiver in accordance with an embodiment of the present invention.

FIG. 5 shows a block diagram of a master and slave transceiver in accordance with an embodiment of the present invention. Master transceiver 10 and slave transceiver 20 may be structurally similar in that they are comprised of an antenna 161, a transceiver 162, a controller 163, and a memory 164.

Master transceiver 10 has a transceiver 162 for transmitting and retransmitting data packets to slave transceiver 20 and for monitoring and evaluating an acknowledgment confirming the successful arrival of data packets. Master transceiver 10 also is comprised of a controller for executing program control such as assembling data packets for transmission by transceiver 162. Controller 163 also receives and processes acknowledgments from transceiver 162 and manages outstanding packet window 120 and outstanding window base pointer 121. A memory 164 facilitates program execution for the described method and also facilitates the cooperation of outstanding packet window 120 and outstanding window base pointer 121. Memory 164 may also be shared with other applications being performed within master transceiver 10 such as data packet buffering or storage.

Slave transceiver 20 has a transceiver 162 for monitoring data packets from master transceiver 10, and for transmitting an acknowledgment confirming the successful arrival of a data packet and previous ones of data packets. Slave transceiver 20 is also comprised of a controller 163 operatively coupled to transceiver 162 for receiving data packets from transceiver 162, and for assembling an acknowledgment for delivery to transceiver 162. A memory 164 facilitates program execution for the described method and also facilitates the cooperation of outstanding packet window 120 and acknowledgment history 115 which contains confirmation for present and previous data packets. Memory 164 may also be shared with other applications being performed within slave transceiver 20 such as data packet buffering or storage.

Figure 6:
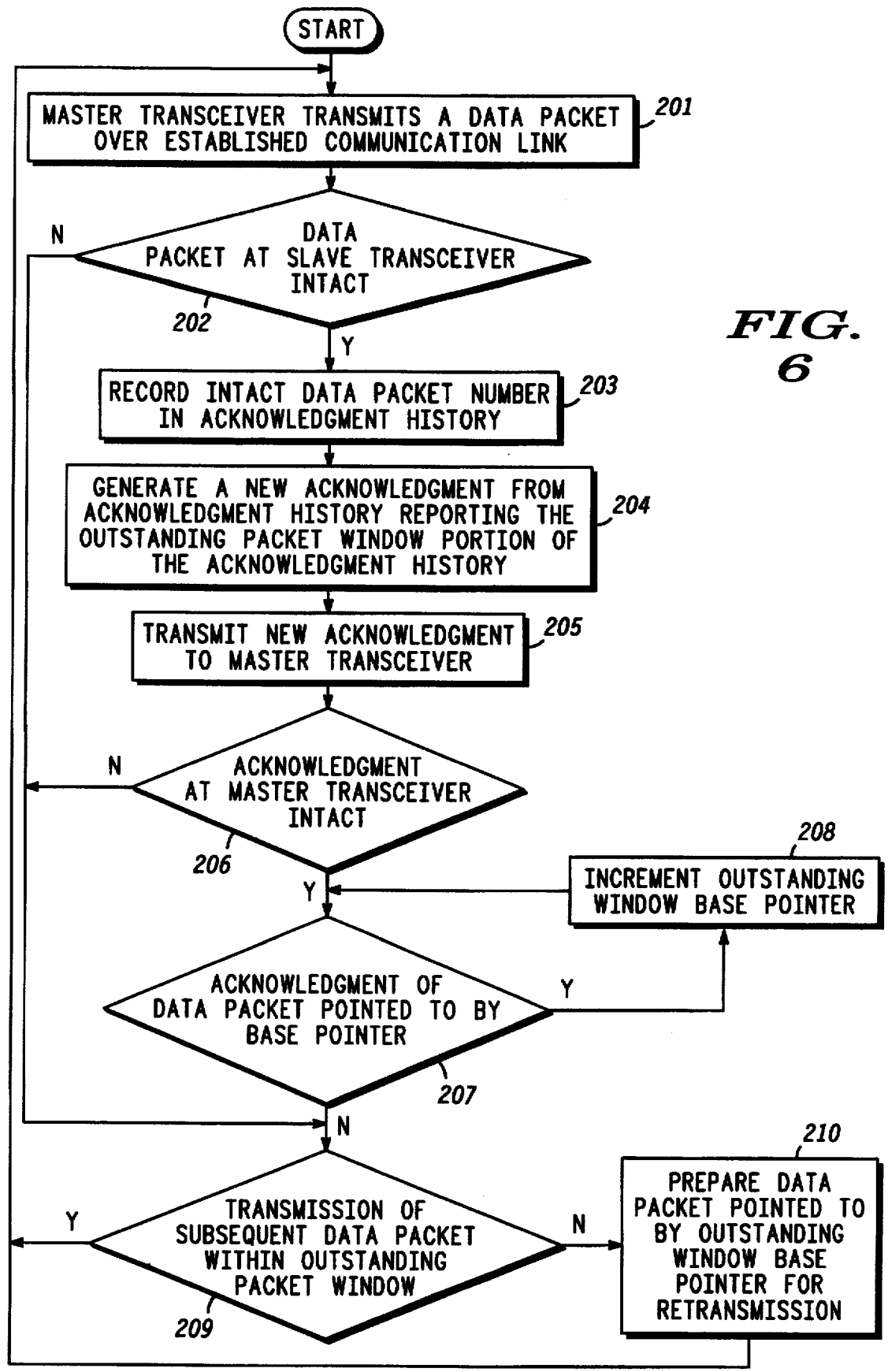
FIG. 6 shows a flowchart of a method for improving acknowledgment delivery and reducing retransmissions of packet data in accordance with an embodiment of the present invention.

FIG. 6 shows a flowchart of a method for improving acknowledgment delivery and reducing retransmissions of packet data in accordance with an embodiment of the present invention.

A task 201 carries out the transmission of a present data packet on an established communication link. This transmission may assume many forms of modulation and propagation mediums which are known by those skilled in the art.

A query task 202 evaluates the arrival and integrity of arrived data packets at a slave transceiver. If the data packet transmitted in task 201 did not arrive or if the integrity of the data packet was impaired, processing passes to a query task 209. If the data packet successfully arrived at slave transceiver 20, then processing passes to a task 203.

Task 203 records, in acknowledgment history 115, data packet number 132 of data packets received intact. Task 203 may store data packet numbers sequentially or in any other housekeeping manner for retrieval. Recording of data packet numbers provides a log of successfully received data packets for use in generating subsequent historical acknowledgments.

A task 204 generates an acknowledgment in response to a valid reception of a data packet. Task 204 retrieves entries from acknowledgment history 115 corresponding to outstanding packet window 120. A task 205 transmits a generated acknowledgment using conventional transmission techniques.

A query task 206 monitors for the arrival of an acknowledgment at master transceiver 10. When an acknowledgment arrives intact, processing passes to a query task 207 for evaluation of the contents of the acknowledgment. When master transceiver 10 determines that an entry exists for the earlier transmitted data packet pointed to by outstanding window base pointer 121, a task 208 increments outstanding window base pointer 121 to a subsequent entry in outstanding packet window 120. This evaluation of the acknowledgment contents and advancement of outstanding window base pointer 121 continues until all entries in the acknowledgment have been serviced.

A task 209 evaluates the feasibility of transmitting a subsequent data packet by master transceiver 10. If transmission of a subsequent data packet would not exceed the bounds of the outstanding packet window 120, then master transceiver 10 prepares another data packet and processing passes to task 201. When transmission of a subsequent data packet would exceed the pre-negotiated outstanding packet window 120, then master transceiver 10 detects the fact that the data packet pointed to by outstanding window base pointer 121 has not been confirmed as having properly arrived at slave transceiver 20. Master transceiver 10 re-prepares that data packet in a task 210 and retransmits the data packet pointed to by outstanding window base pointer 121 in its entirety in task 201.

Thus, a method and system for minimizing the retransmission of data packets that were in fact successfully received by a receiving transceiver but were not successfully acknowledged has been described. By employing historical data in acknowledgments from a receiving slave node, a data packet dispatching master node receiving an acknowledgment may extract additional insight into which data packets successfully arrived at a receiving node even when received acknowledgments are sporadic.

The present invention overcomes specific problems and accomplishes certain advantages relative to prior art methods and mechanisms. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a communication system, a method for reducing retransmissions of data packets between a slave transceiver and a master transceiver, said method comprising the steps of:

when an outstanding packet window is not exceeded, firstly transmitting at least one data packet from said master transceiver, said outstanding packet window being a pre-negotiated quantity of outstanding ones of said data packets; and when said slave transceiver receives said at least one data packet intact, secondly transmitting an acknowledgment for confirming a successful arrival of said at least one data packet and previous ones of said at least one data packet, said acknowledgment corresponding to said outstanding packet window.

2. A method as recited in claim 1, further comprising the step of:

when said firstly transmitting at least one data packet would exceed said outstanding packet window, retransmitting a previous one of said at least one data packet until said master transceiver receives said acknowledgment confirming a successful arrival of said previous one of said at least one data packet.

3. A method as recited in claim 2, further comprising the step of:

prior to said secondly transmitting said acknowledgment, said slave transceiver recording a packet number contained in said at least one data packet in an acknowledgment history kept by said slave transceiver.

4. A method as recited in claim 3, further comprising the step of:

subsequent to said recording step and prior to said secondly transmitting step, generating said acknowledgment from said acknowledgment history, said acknowledgment comprising confirmations for said at least one data packet and all of said previous one of said at least one data packet occurring within said outstanding packet window.

5. In a master transceiver in a communication system, a method for reducing retransmissions of data packets between a slave transceiver and said master transceiver, said method comprising the steps of:

when an outstanding packet window is not exceeded, transmitting at least one data packet from said master transceiver, said outstanding packet window being a pre-negotiated quantity of outstanding ones of said data packets; and monitoring for an acknowledgment confirming a successful arrival of said at least one data packet and previous ones of said at least one data packet, said acknowledgment corresponding to said outstanding packet window.

6. A method as recited in claim 5, further comprising the step of:

when said firstly transmitting at least one data packet would exceed said outstanding packet window, retransmitting a previous one of said at least one data packet until said master transceiver receives said acknowledgment confirming a successful arrival of said previous one of said at least one data packet.

7. A method as recited in claim 6, further comprising the steps of:

when said acknowledgment is received during said monitoring step, evaluating said acknowledgment; and while said acknowledgment confirms an oldest one of said at least one data packet within said outstanding packet window was received by said slave transceiver, incrementally advancing said outstanding packet window.

8. In a slave transceiver in a communication system, a method for reducing retransmissions of data packets between a slave transceiver and a master transceiver, said method comprising the steps of:

monitoring for at least one data packet from said master transceiver; and when said slave transceiver receives said at least one data packet intact, transmitting an acknowledgment for confirming a successful arrival of said at least one data packet and previous ones of said at least one data packet, said acknowledgment corresponding to an outstanding packet window, said outstanding packet window being a pre-negotiated quantity of successive ones of said data packets.

9. A method as recited in claim 8, further comprising the step of:

prior to said transmitting said acknowledgment step, said slave transceiver recording a packet number contained in said at least one data packet in an acknowledgment history kept by said slave transceiver.

10. A method as recited in claim 9, further comprising the step of:

subsequent to said recording step and prior to said transmitting step, generating said acknowledgment from said acknowledgment history, said acknowledgment comprising confirmations for said at least one data packet and all of said previous ones of said at least one data packet occurring within said outstanding packet window.

11. A communication system having reduced retransmissions of data packets, said communication system comprising:

when an outstanding packet window is not exceeded, a master transceiver for firstly transmitting at least one data packet from said master transceiver, said outstanding packet window being a pre-negotiated quantity of successive ones of said data packets; and a slave transceiver for receiving said at least one data packet intact and for secondly transmitting an acknowledgment for confirming a successful arrival of said at least one data packet and previous ones of said at least one data packet, said acknowledgment corresponding to said outstanding packet window when said slave transceiver receives said at least one data packet intact.

12. A communication system as recited in claim 11, wherein said master transceiver further comprises:

a means for retransmitting a previous one of said at least one data packet until said master transceiver receives said acknowledgment confirming a successful arrival of said previous one of said at least one data packet.

13. A communication system as recited in claim 12, wherein said slave transceiver further comprises:

a means for recording a packet number contained in said at least one data packet in an acknowledgment history maintained by said slave transceiver.

14. A communication system as recited in claim 13, wherein said slave transceiver further comprises:

a means for generating said acknowledgment from said acknowledgment history, said acknowledgment comprising confirmations for said at least one data packet and all of said previous one of said at least one data packet occurring within said outstanding packet window.

15. A master transceiver for reducing retransmissions of data packets between a slave transceiver and said master transceiver, said master transceiver comprising:

a transceiver for transmitting at least one data packet within an outstanding packet window, said outstanding packet window being a pre-negotiated quantity of successive ones of said data packets and said transceiver for monitoring for an acknowledgment confirming a successful arrival of said at least one data packet and previous ones of said at least one data packet, said acknowledgment corresponding to said outstanding packet window; and a controller operatively coupled to said transceiver for assembling said at least one data packet for transmission by said transceiver, said controller also for receiving and processing said acknowledgment from said transceiver and for managing said outstanding packet window.

16. A master transceiver as recited in claim 15, further comprising:

a means for retransmitting a previous one of said at least one data packet until said master transceiver receives said acknowledgment confirming a successful arrival of said previous one of said at least one data packet.

17. A master transceiver as recited in claim 16, wherein said controller further comprises:

a means for evaluating said acknowledgment; and a means for incrementally advancing said outstanding packet window when said acknowledgment confirms an oldest one of said at least one data packet within said outstanding packet window was received by said slave transceiver.

18. A slave transceiver for reducing retransmissions of data packets between said slave transceiver and a master transceiver, said slave transceiver comprising:

a transceiver for monitoring for at least one data packet from said master transceiver, and for transmitting an acknowledgment confirming a successful arrival of said at least one data packet and previous ones of said at least one data packet, said acknowledgment corresponding to an outstanding packet window, said outstanding packet window being a pre-negotiated quantity of successive ones of said data packets; and a controller operatively coupled to said transceiver for receiving said at least one data packet from said transceiver, and for assembling said acknowledgment for delivery to said transceiver.

19. A slave transceiver as recited in claim 18 further comprising:

a memory operatively coupled to said controller for recording a packet number contained in said at least one data packet in an acknowledgment history.

20. A slave transceiver as recited in claim 19 wherein said controller further comprises:

a means for generating said acknowledgment from said acknowledgment history, said acknowledgment comprising confirmations for said at least one data packet and all of said previous one of said at least one data packet occurring within said outstanding packet window.

* * * * *